Nov. 5, 1957  A. H. SARKISIAN  2,811,915
BARBECUE MACHINE
Filed July 12, 1954  3 Sheets-Sheet 1
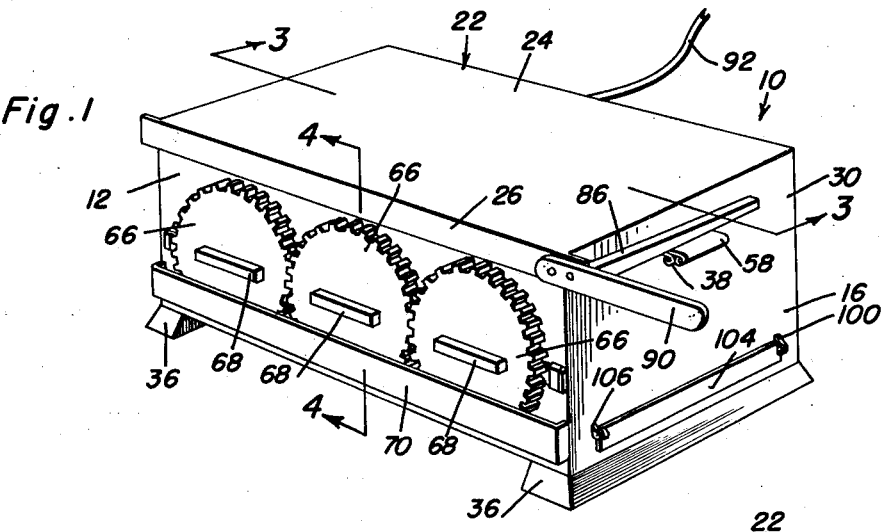
Arakel H. Sarkisian
INVENTOR.

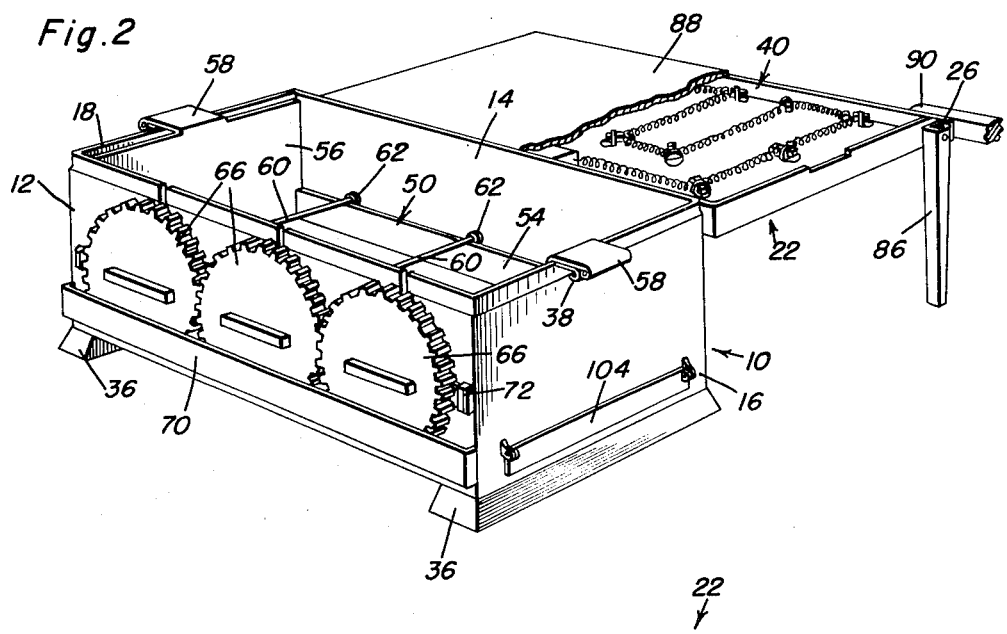
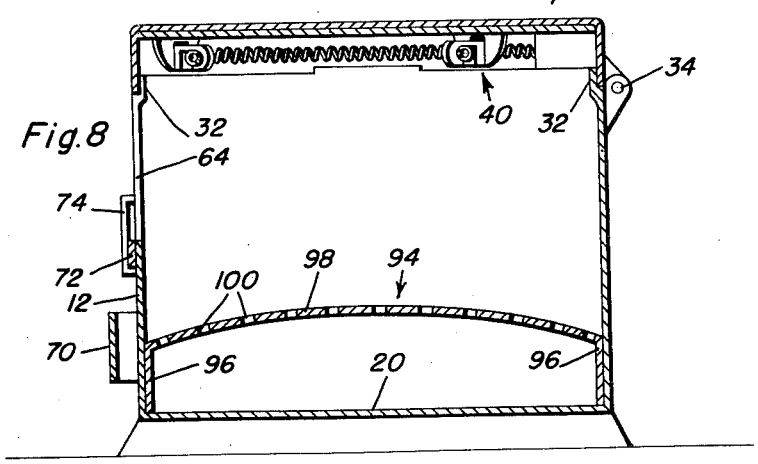
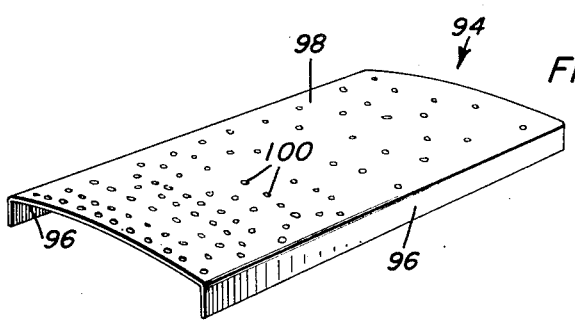

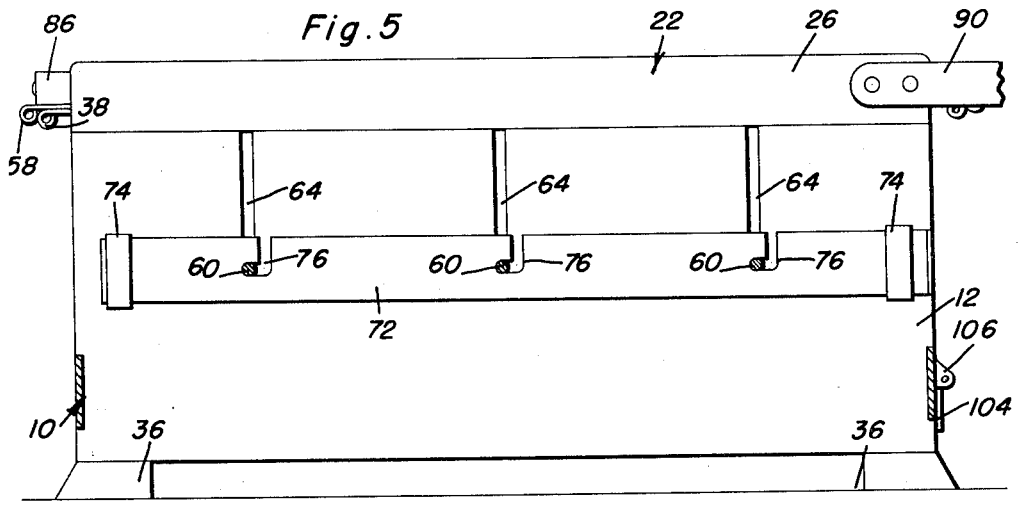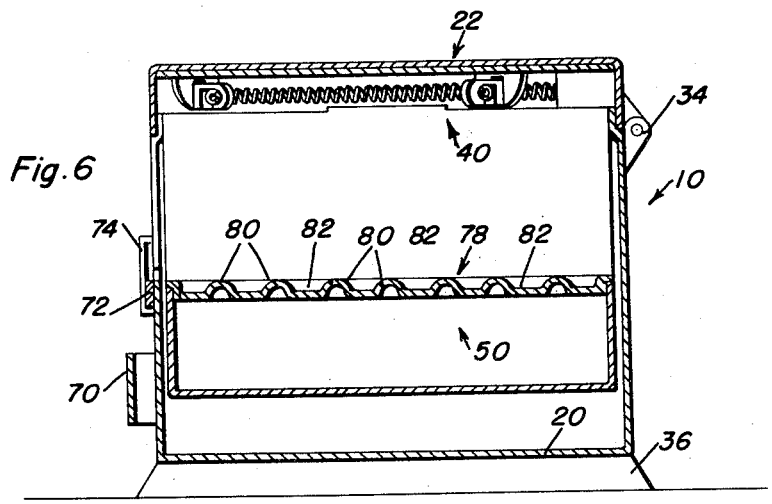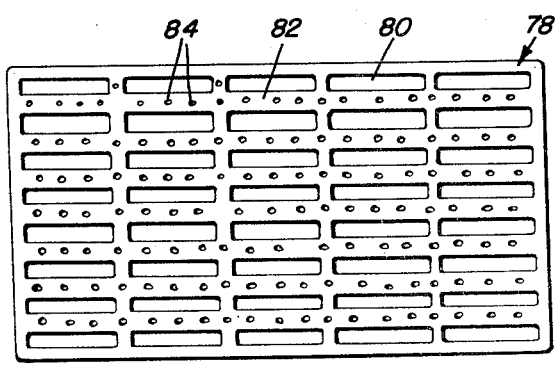

United States Patent Office 2,811,915
Patented Nov. 5, 1957

2,811,915

BARBECUE MACHINE

Arakel H. Sarkisian, Bridgewater, Mass.

Application July 12, 1954, Serial No. 442,631

1 Claim. (Cl. 99—421)

This invention relates in general to cooking accessories, and more specifically to an improved barbecue machine.

The primary object of this invention is to provide an improved barbecue machine which is extremely portable and which is so constructed and designed whereby it may be utilized either with a solid fuel, such as charcoal, or may utilize an electrical heating unit.

Another object of this invention is to provide an improved cooking implement in the form of a barbecue machine having a housing and a hingedly mounted cover, the cover being provided with a heating unit which may be selectively utilized as a cover for the housing and for barbecuing of foods therein, or as a heating unit for a grill with the cover being disposed in a pivoted offset position with respect to the remainder of the housing.

Another object of this invention is to provide an improved barbecue machine which is provided with removable food support means in the form of spits and a hamburger tray, the spits being removably locked in place by convenient locking means and being so constructed whereby all of the spits may be turned simultaneously by turning any one of the spits.

A further object of this invention is to provide an improved barbecue machine which is primarily intended for use with an electrical power source but which is provided with a removable screen for the supporting of solid fuel, such as charcoal, whereby the barbecue machine may be utilized when there is no convenient electrical source or when it is desired to obtain the taste and quality of charcoal grilled foods.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view of the barbecue machine which is the subject of this invention and shows the same in a barbecuing position with the spits thereof in place;

Figure 2 is a perspective view similar to Figure 1 and shows the cover of the barbecue machine in a pivoted offset position but functioning as a grill, a removable grill plate being shown in position, a portion of the grill plate being broken away in order to illustrate the relationship of heating elements with respect thereto;

Figure 3 is an enlarged longitudinal vertical sectional view taken substantially upon the plane indicated by the section line 3—3 of Figure 1 and shows the interior construction of the barbecue machine utilizing the heating elements and the spits;

Figure 4 is a transverse vertical sectional view on an enlarged scale taken substantially upon the plane indicated by the section line 4—4 of Figure 1 and shows the general manner in which the individual spits are mounted;

Figure 5 is an enlarged vertical sectional view taken substantially upon the plane indicated by the section line 5—5 of Figure 4 and shows the manner in which the spits are locked in the housing of the barbecue machine against vertical movement;

Figure 6 is an enlarged transverse vertical sectional view similar to Figure 4 and shows the barbecue machine with the spits removed and a barbecue tray positioned in lieu thereof;

Figure 7 is an enlarged top plan view of the barbecue tray of Figure 6;

Figure 8 is an enlarged vertical sectional similar to Figure 4 and shows the spits and a grease pan of the barbecue machine omitted and a solid fuel supporting screen disposed in the bottom portion of the housing of the barbecue machine for receiving solid fuel such as charcoal; and Figure 9 is a perspective view of the screen of Figure 8.

Referring now to the drawings in detail, it will be seen that the barbecue machine, which is the subject of this invention, includes a housing which is referred to in general by the reference numeral 10. The housing 10 is generally box-like and includes a front wall 12, a rear wall 14, and end walls 16 and 18 extending between the front wall 12 and the rear wall 14. The housing 10 further includes a bottom 20 and a hingedly mounted cover which is referred to in general by the reference numeral 22.

The cover 22 includes a top wall 24, a front flange 26, a rear flange 28 and end flanges 30.

As is best illustrated in Figure 4, the front flange 26 and rear flange 28 are seated in offset upper portions 32 of their respective front wall 12 and rear wall 14. Also, it will be seen that the cover 22 is hingedly secured in place by hinges 34 which are also secured to the rear wall 14 adjacent the upper edge thereof.

The housing 10 includes a pair of transversely extending supports 36 which are secured to the underside of the bottom wall 20 along opposite ends thereof. In order to facilitate the carrying of the housing 10, the end walls 16 and 18 are provided at the upper edges thereof with outwardly directed, relatively narrow handles 38.

Carried by the cover 22 within the confines thereof is an electrical heating unit which is referred to in general by the reference numeral 40. The electrical heating unit 40 includes a plate 42 which has struck therefrom a plurality of depending tabs 44. The tabs 44 have secured thereto in insulated relation through suitable clips 46 heating coils 48. It is to be noted that the heating unit 40 directly overlies the interior of the housing 10 for directing heat onto foods disposed therein.

In order to prevent grease from accumulating within the housing 10, there is provided a removable grease pan which is referred to in general by the reference numeral 50. The grease pan 50 includes a bottom wall 52, front and rear walls 54 and end walls 56. The end walls 56 are bent upwardly above the front and rear walls 54 and terminate in outwardly directions, relative narrow flanges 58. The flanges 58 overlie the handles 38 and support the grease pan 50 within the housing 10 above the bottom wall 20 thereof.

In order that foods may be conveniently barbecued within the barbeque machine, there are provided spits 60. The spits 60 extend between the front wall 12 and rear wall 14 of the housing 10 and have their rear ends rotatably supported in bushings 62 secured to the inner face of the rear wall 14. The spits 60 directly overlie the front and rear walls 54 of the grease pan 50 and are located in the lower parts of L-shaped slits 64 formed in the front wall 12, as is best illustrated in Figure 5.

Carried by the forwardmost ends of the spits 60 are gears 66. The gears 66 of the various spits 60 are intermeshed so that when one of the gears 66 is turned, the others of the gears 66 are similarly turned so that all of the spits 60 may be rotated at one time. To facilitate rotation of the spits 60, each of the gears 66 is provided with a suitable engaging block 68.

Although there has been illustrated only three spits 60, it is to be understood that the number of spits may be varied as desired and in most family size barbecue machines, five spits may prove to be the best number. Further, while the spits have been described as being hand-rotated, if desired, a suitable drive motor (not shown) may be provided.

In order that the spits 60 cannot move longitudinally out of their respective bushings 62, there is provided a strap 70 which is secured to the front wall 12 and which engages the front surfaces of the gears 66 to retain the gears 66 closely adjacent the outer face of the front wall 12.

To further lock the spits 60 in place, there is provided a locking bar 72. The locking bar 72 has its ends slidably carried in a pair of straps 74 secured to the front wall 12 adjacent opposite ends thereof. The strap 72 is provided with a plurality of L-shaped slits 76 which are directed in opposite directions to those of the L-shaped slits 64. Until such time as the vertical portions of the slits 76 are aligned with the slits 64, the spits 60 cannot be moved vertically and since the gears 66 are prevented from moving transversely of the housing 10, the spits 60 are obviously locked in place.

When it is desired to barbecue or fry foods such as hamburgers, the spits 60 and their associated parts are removed. Then there is placed within the housing 10 a hamburger tray which is referred to in general by the reference numeral 78. The hamburger tray 78 is in the form of either a molded or stamped plate and includes a plurality of ribs 80 on which hamburgers or the like may be supported. Disposed between the individual ribs 80 are suitable recesses 82 for receiving grease. The recesses 82 are provided with apertures 84 therethrough, as is best illustrated in Figure 7, whereby grease may pass from the recesses 82 down into the grease pan 50.

At times the barbecue machine 10 may be utilized as a grill. Accordingly, the cover 22 is pivotable to an offset position with respect to the remainder of the housing, as is best illustrated in Figure 2. In order that the cover 22 may be supported in its offset portion of Figure 2, there is pivotally secured to extensions of the front flange 26 legs 86. The legs 86 are horizontally disposed when the cover 22 is in its normal position and rest upon the panels 38 or the flanges 58, depending on whether or not the grease pan 50 is positioned.

In order that the barbecue machine may be utilized as a grill, there is removably carried by the cover 22 a grill plate 88. The grill plate 88 is removable from the cover 22 and overlies the same when it is in its offset position in Figure 2. The grill plate 88 directly overlies the heating unit 40 and receives heat therefrom.

In order to facilitate the movement of the cover 22 from its normal position overlying the remainder of the housing pin to its offset position of Figure 2, and back again to its normal position, the cover 22 is provided with a handle 90. The handle 90 is secured to one of the extensions of the front flange 26 and may be easily grasped by one without burning one's hand.

While the barbecue machine is primarily intended to be utilized with an electrical power source through an electric line 92 which may be plugged into any convenient electrical outlet, the barbecue machine may also utilize a solid fuel, such as charcoal. Therefore, there is provided a charcoal screen which is best illustrated in Figure 9 and which is referred to in general by the reference numeral 94. The charcoal screen 94 includes a pair of longitudinally disposed vertical flanges 96 which have extending therebetween an arcuate fuel supporting portion 98. The fuel supporting portion 98 is provided with a plurality of apertures 100 to permit both the proper passage of air and to permit the ashes of the charcoal or other solid fuel to drop into the bottom part of the housing 10.

In order that the solid fuel may have a proper draft, there is formed in the end walls 16 an elongated opening 102. The opening 102 is normally closed by a damper 104 which may be conveniently moved to an open position. The damper 104 is hingedly mounted with respect to the end walls 16 of a suitable hinge structure 106.

Inasmuch as the hamburger plate 78 is supported by the grease pan 50 and since the grease pan 50 is not utilized when the screen 94 is utilized, it is apparent that the hamburger plate or tray 78 will not be utilized under normal circumstances with the screen 94. However, it is readily apparent that special fittings could be provided to support the hamburger tray 78 above the screen 94 if desired. However, the supporting means for the spits 60 is such that they may be conveniently utilized in combination with the screen 94.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claim.

What is claimed as new is as follows:

A barbecue machine comprising a housing having an open top, a cover pivotally mounted on said housing, said cover normally overlying the top of said housing and closing the same, a heating unit mounted in said cover and normally facing the bottom of said housing, a removable grease pan disposed within said housing, said housing having spaced end walls, said grease pan having outwardly extending handles resting upon said end walls and projecting therebeyond with said grease pan being supported above the bottom of said housing, means within said housing for supporting foods above said grease pan, said means being in the form of spits, gear means carried by said spits, means on said housing retaining said gear means against movement longitudinally of said spits to retain said spits in place, vertical slits in one wall of said housing, said spits disposed in said vertical slits, and a locking bar carried by said housing retaining said spits against vertical movement.

References Cited in the file of this patent

UNITED STATES PATENTS

| | | |
|---|---|---|
| 2,242,328 | Russell et al. | May 20, 1941 |
| 2,313,968 | Reich | Mar. 16, 1943 |
| 2,485,890 | Keljik | Oct. 25, 1949 |
| 2,664,490 | Allgeyer | Dec. 29, 1953 |